United States Patent [19]
Bleiman

[11] 3,972,535
[45] Aug. 3, 1976

[54] SPINDLE DRIVE MOTOR

[75] Inventor: Lewis William Bleiman, Northridge, Calif.

[73] Assignee: Pertec Corporation, Chatsworth, Calif.

[22] Filed: Nov. 8, 1974

[21] Appl. No.: 522,220

[52] U.S. Cl. .............. 274/39 A; 310/49 R; 318/696
[51] Int. Cl.² ............... G11B 03/60; H02K 37/00
[58] Field of Search .......... 274/39 A, 1 E; 318/685, 318/696, 138; 310/49 R, 162–164; 360/135, 86, 99

[56] References Cited
UNITED STATES PATENTS

| | | | |
|---|---|---|---|
| 1,963,669 | 6/1934 | Murphy | 274/1 E |
| 2,790,124 | 4/1957 | Eisele | 310/49 R |
| 3,280,398 | 10/1966 | Marie | 310/49 R |
| 3,343,014 | 9/1967 | Giles | 310/49 R |
| 3,369,227 | 2/1968 | Boissevain | 274/39 A |
| 3,411,058 | 11/1968 | Madsen et al. | 318/696 |
| 3,683,248 | 8/1972 | Kobayashi et al. | 274/39 A |
| 3,706,085 | 12/1972 | Mowrey et al. | 274/39 R |
| 3,768,815 | 10/1973 | Mathurin | 346/137 |
| 3,801,891 | 4/1974 | Davenport | 310/49 R |
| 3,818,261 | 6/1974 | Clarke, Jr. | 318/696 |

Primary Examiner—Samuel B. Rothberg
Assistant Examiner—Richard R. Stearns
Attorney, Agent,'or Firm—Lindenberg, Freilich, Wasserman, Rosen & Fernandez

[57] ABSTRACT

A system for driving a flexible magnetic disk including a direct current stepper motor having a shaft directly connected to the disk drive hub. Motor controller means activate the motor to bring it from rest up to a desired speed, e.g., 360 rpm, and thereafter maintain the speed constant. The motor controller initially provides a detent pulse to move the rotor to a starting position and then provides pulses of decreasing duration and increasing frequency to accelerate the motor to the desired speed.

7 Claims, 5 Drawing Figures

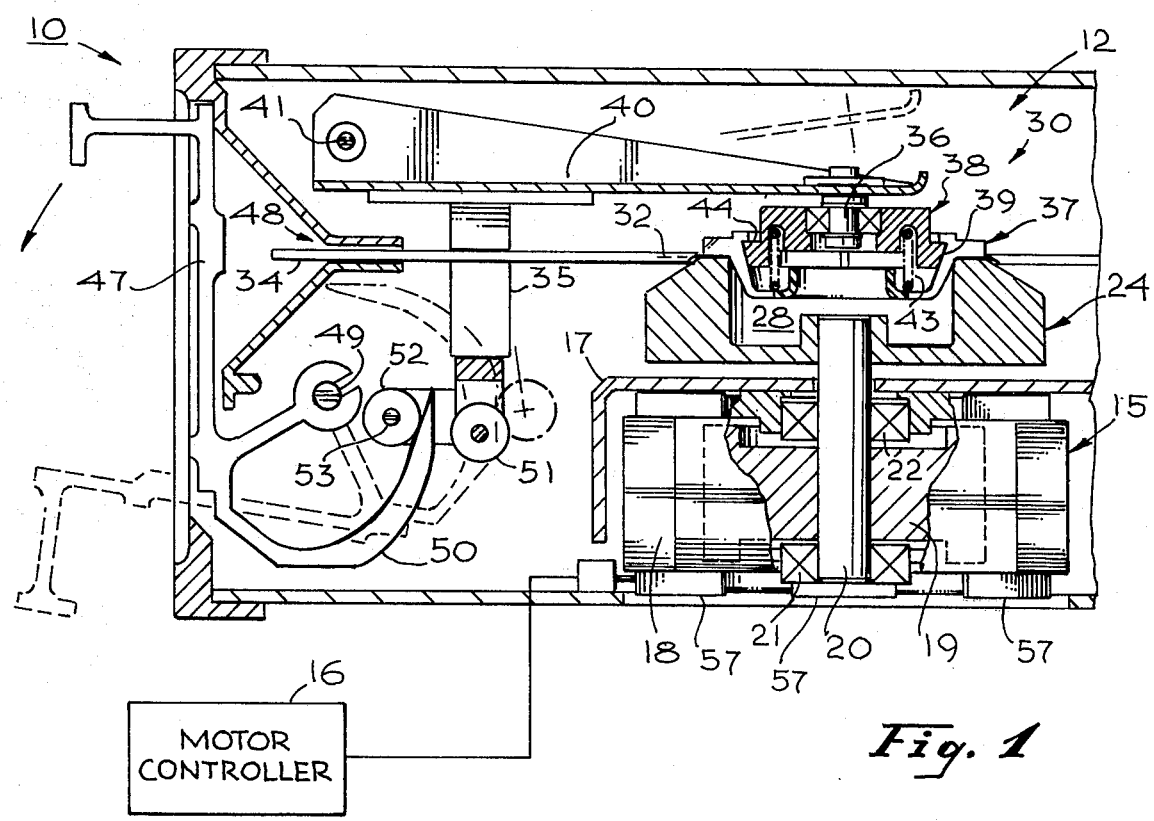
Fig. 1
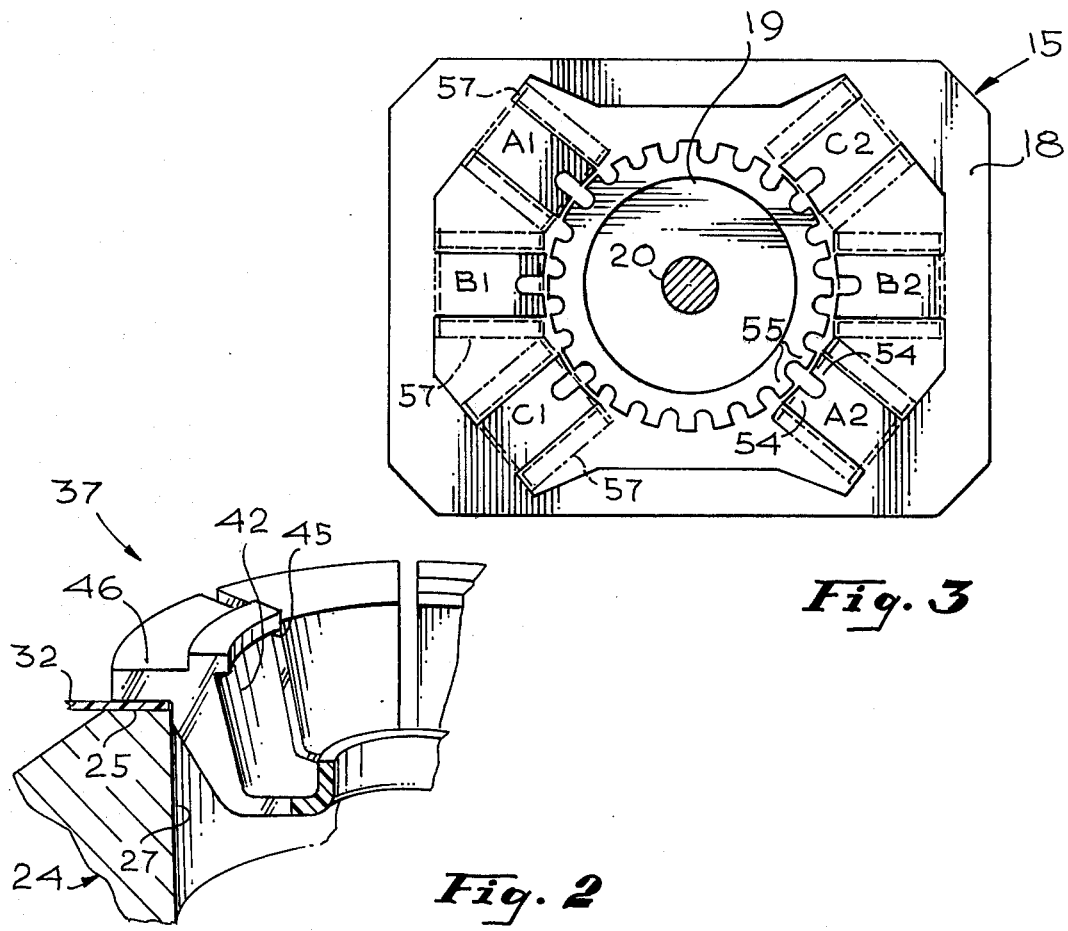
Fig. 3
Fig. 2

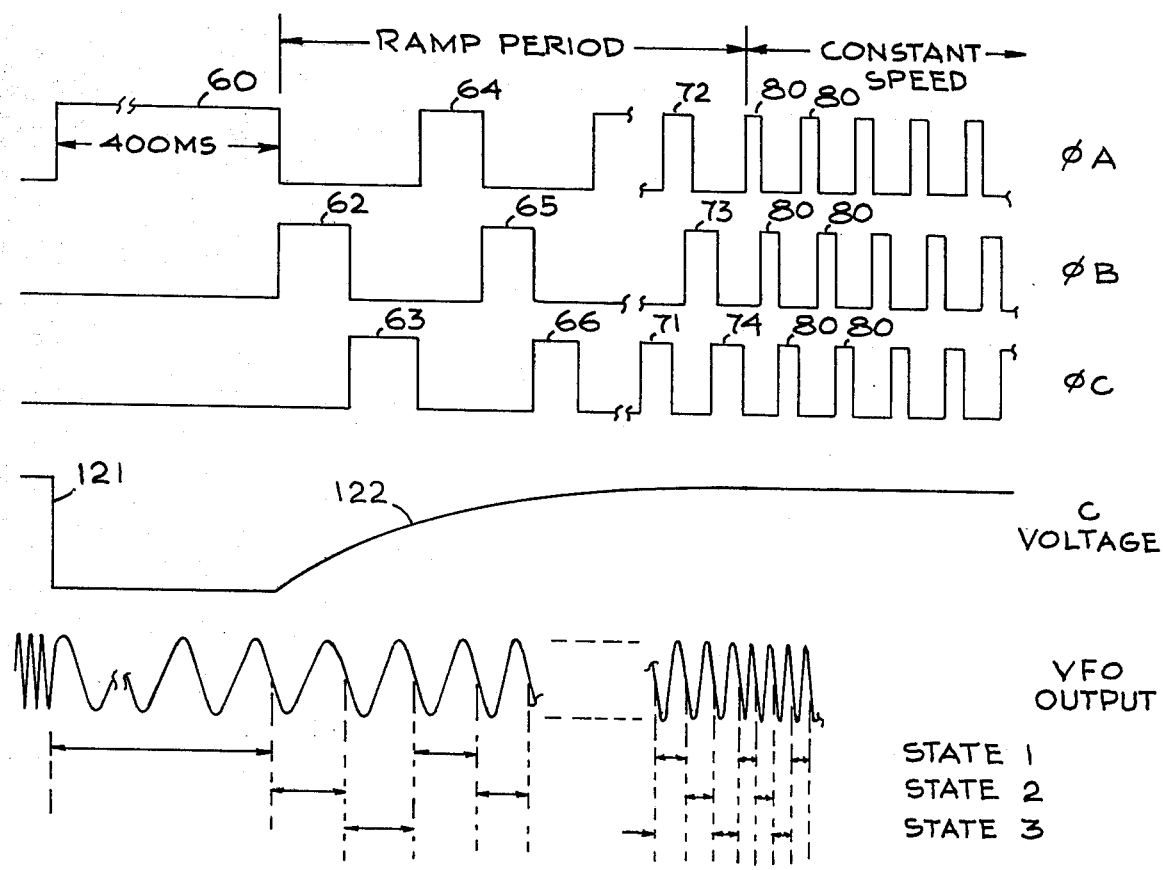
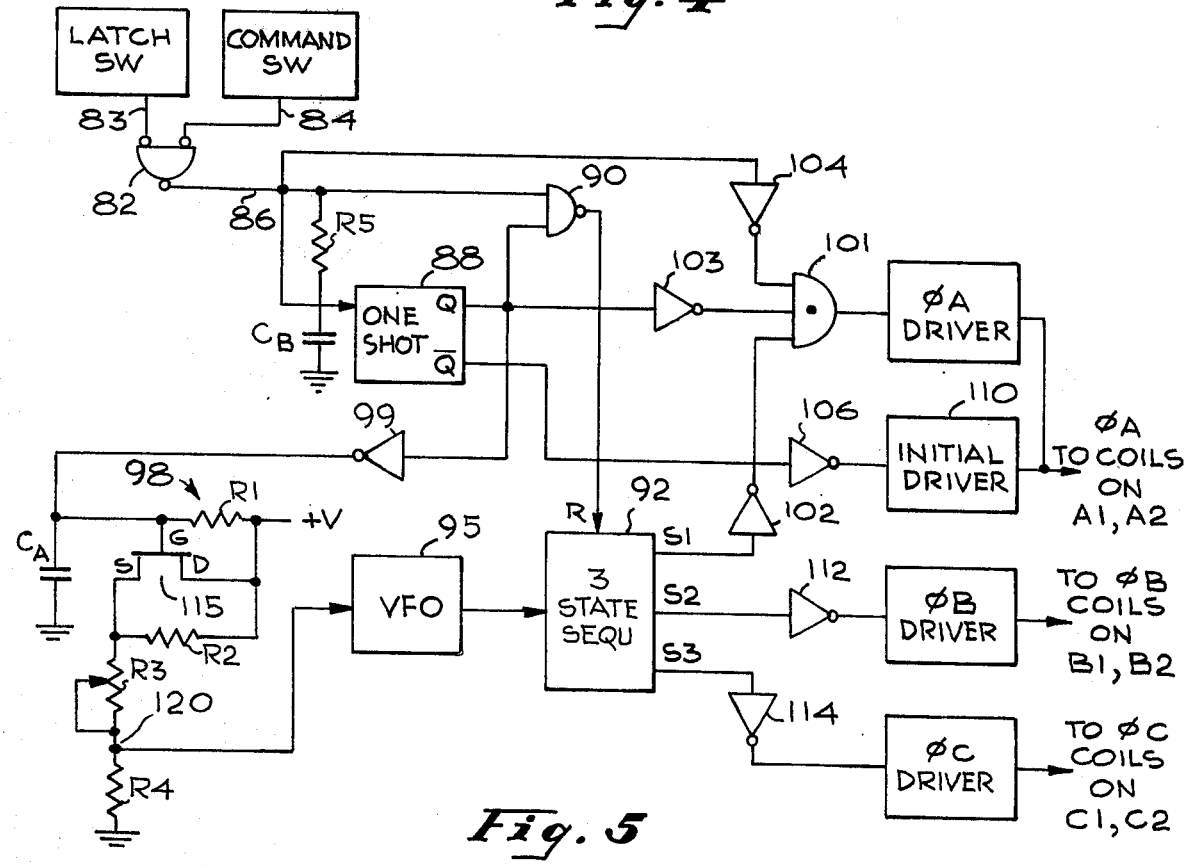

SPINDLE DRIVE MOTOR

BACKGROUND OF THE INVENTION

This invention relates to improvements in disk drive systems and, more particularly, to an improved drive arrangement for a flexible magnetic disk.

Recently developed flexible magnetic disks, which comprise a convenient and low cost information storage media, are finding an increasing variety of applications. Typically, each disk is housed in a flat cartridge in which it rotates. Various drive systems have been developed to rotate the disk at a uniform speed about a precise axis. In use, the cartridge is held stationary while the disk is rotated therein, with its rotating surface being accessible through a radial slot in the cartridge.

A portion of a typical flexible disk drive system is disclosed in U.S. Pat. No. 3,768,815 which shows a hub coupled to a drive shaft and wherein the hub has annular inner walls which define an annular recess and a flat face portion. Also included is a rotatable expandable collet and wedging means. The function of the latter is to expand the collet against the hub so as to clamp a central annular portion of the flexible magnetic disk between the flat face portion of the hub and the collet. Thus, as the hub rotates, the clamped disk rotates therewith at the same speed.

In known prior art flexible magnetic disk drive systems, the hub shaft is indirectly coupled to a driving motor. The indirect coupling is generally achieved by the utilization of gears and/or different belt-pulley arrangements which serve to couple the driving motor shaft to the hub shaft and to reduce the hub shaft speed to a desired value, typically 360 rpm. The indirect coupling of the hub shaft to the driving motor increases the system's complexity and cost. Generally AC driving motors, e.g. synchronous motors, are used due to the fact that their output speeds do not vary as a result of appreciable changes of input voltage or load. Due to the different voltage and frequency standards throughout the world, however, a given drive system using one of these motors, built for use in one part of the world, may have to be modified for use in a different part of the world with different voltage and frequency standards.

SUMMARY OF THE INVENTION

The present invention is directed to a system for driving a flexible magnetic disk and includes a direct current stepper motor whose shaft is directly connected to the disk drive hub thereby eliminating the need for gears, pulleys and belts which have been used in the prior art. In a preferred embodiment of the invention, pulse circuit means are provided to activate the motor so as to bring it from rest up to a desired speed, e.g. 360 rpm, and thereafter maintain the speed constant.

The motor is comprised of a fixed stator and a rotor having a shaft fixed thereto mounted for rotation. The rotor essentially comprises a cylinder of ferromagnetic material having teeth formed around the circumferential surface thereof. The stator is comprised of several pairs of opposed poles wound by individual coils, with the coils of the different pole pairs being pulsed sequentially to cause the rotor to rotate. In order to bring the rotor up to the desired speed from rest, the rotor is driven to a first detent position by energizing coils on a selected pair of poles. Thereafter, pulses of decreasing duration and increasing frequency are sequentially applied to the coils of the different pole pairs during a ramp interval, generally on the order of a few seconds. Subsequently, the duration and frequency of the pulses are held constant so as to maintain the motor at the desired speed.

The novel features of the invention are set forth with particularity in the appended claims. The invention will best be understood from the following description when read in conjunction with the accompanying drawings.

BRIEF DESCRIPTION OF THE DRAWINGS

FIG. 1 illustrates a system in accordance with the invention showing a typical disk clamping mechanism in section;

FIG. 2 is an enlarged fragmentary sectional view showing the engagement of collet and disk;

FIG. 3 is a sectional view of a direct current stepper motor used in accordance with the present invention;

FIG. 4 is a waveform diagram illustrating drive pulses developed for energizing the motor; and FIG. 5 is a schematic block diagram illustrating the motor controller circuitry for developing the drive pulses of FIG. 4.

DESCRIPTION OF THE PREFERRED EMBODIMENTS

Attention is now directed to FIG. 1 which illustrates a flexible disk drive system 10 incorporating features in accordance with the present invention. The system generally consists of a disk drive unit 12, a direct current stepper motor 15, and a motor controller 16.

Briefly, the motor 15 is comprised of a housing 17 having a stator 18 mounted therein. A rotor 19 having a shaft 20 directly physically coupled thereto is mounted in bearings 21 and 22 for rotation with respect to housing 17 and stator 18. An annular hub 24 is fixed to the distal end of drive shaft 20 by suitable means, such as an appropriate adhesive. The hub 24 includes a flat face portion 25 (see FIG. 2) and an annular inner wall 27, defining a cylindrical recess 28. A disk clamping mechanism 30 cooperates with the hub 24 to clamp a flexible disk 32 therebetween to rotate the disk as the hub 24 rotates. The disk 32 is contained within a flat rectangular cartridge 34 which is restrained from rotating by guides 35. The disk clamping mechanism 30 includes a support shaft 36 supported on an arm 40 mounted for pivotal movement about axis 41. An expandable collet 37 and wedging means 38 are carried by the shaft 36 for rotational motion thereabout. The wedging means 38 has a conical external surface 39 which cooperates with the internal conical surface 42 of collet 37. A spring 43 is mounted between the collet 37 and wedging means 38 and acts to urge the collet 37 and wedging means 38 apart so that when the arm 40 is in the unclamped position (dashed line in FIG. 1) the wedging means shoulder 44 engages the collet shoulder 45. When the arm 40 is moved to the clamped position, the collet flange 46 clamps the disk 32 against the hub face portion 25. As the collet flange 46 engages the hub, the wedging means conical surface 39 moves relative to the collet conical surface 42, against the action of spring 43, to radially expand the collet and center the disk 32 with respect to the drive shaft 20.

As shown in FIG. 1, a disk cartrdige 34 can be inserted through a front end of the chassis by opening a door 47 to the dashed line position to allow insertion of the cartridge through a slot-like opening 48. The door 47, which is pivotally mounted about an axis 49, carries a cam 50 which can move a clamp arm 40 carrying the clamp mechanism 30 between the disk clamped position shown in full line in FIG. 1 and the unclamped position shown in dashed line. The clamp arm 40 is mounted for pivotal movement about axis 41 and carries a roller-type cam follower 51 which can be moved by the door-mounted cam 50. When the door is fully opened to the dashed line position, the cam follower 51 moves to a position to pivot the clamp arm 40 so that the cartrdige can be fully inserted into position. When the door is then closed, the clamp arm 40 is pressed down by reason of engagement of a second roller-type cam follower 52 with the other side of the cam 50. The second cam follower 52 is mounted on a long resilient axle 53, so that the cam follower 52 resiliently presses on the cam.

Unlike prior art drive systems in which a hub drive shaft is indirectly coupled, as by gears, pulleys and belts to the output shaft of a motor, in the present invention, the hub 24 is physically directly coupled to the motor drive shaft 20, thereby greatly simplifying the drive system complexity and cost.

As shown in FIG. 1, in accordance with the preferred embodiment of the invention, a direct current stepper motor 15 is used to drive the hub 24. Since a direct current motor is not dependent on the different voltage and frequency standards, a standard drive system with such a motor can be used throughout the world. As will be explained hereinafter, in a preferred embodiment, the motor 15 is controlled in an open loop arrangement by motor controller 16. The function of the latter is to apply pulses to motor 15 in order to increase its speed from rest to a desired speed and thereafter maintain it at such speed as long as the door 47 is latched, and a drive signal is applied to the controller 16 from an appropriate external source.

A preferred embodiment of the stepper motor 15 and the controller 16 are best explained in connection with FIGS. 3–5. In FIG. 3, numerals 18 and 19 respectively designate the motor stator and rotor, both constructed of ferromagnetic material. The stator 18 is preferably fabricated in laminar fashion by stacking plates (not shown) and defines three pairs of poles, the pairs being designated by the letters A, B, and C and the poles in each pair by the pair-letter designation followed by the suffixes 1 and 2. The front face of each pole is shaped to essentially define two spaced teeth designated 54. The rotor 19 comprises a disk mounted for rotation about shaft 20 fixed thereto. The rotor has a plurality of teeth 55 formed along the circumferential surface thereof. The teeth 55 are uniformly spaced about the rotor periphery and in the particular example, 24 teeth are provided around the rotor periphery. The spacing between the two teeth on each pole face is equal to the spacing between adjacent rotor teeth. Thus, the rotor can rotate to a position at which two rotor teeth are opposed to and aligned with the two teeth on a pole face. The pole pairs are arranged such that for any position of the rotor, the rotor teeth are aligned with the teeth on only one pole pair.

Drive shaft 20 is physically secured directly to the rotor 19 and as has been mentioned, at its distal end is secured directly to hub 24.

Surrounding each pole is a separate coil 57. As will be explained in greater detail hereinafter, the coils associated with poles of the same pair are simultaneously energized and coils associated with poles of different pairs are successively energized. The pulses applied to each pair of coils are such so as to develop a magneto-motive force which causes the rotor 19 to rotate. Although the stepper motor embodiment illustrated utilizing coils on the stator is preferred, it should be recognized that the roles of the stator and rotor, as illustrated, could be reversed with the coil wound pole pairs being provided on the rotor.

Assuming a design speed of 360 rpm and 24 teeth along the periphery of rotor 19, then the number of rotor teeth which pass each of the poles per second is $360/60 \times 24 = 144$. Thus, the duration between successive teeth passing each pole when the rotor is rotating at 360 rpm is 6.94 ms. In the preferred embodiment illustrated, since the coils on each pair of poles are pulsed simultaneously while coils on different pairs of poles are pulsed successively, with a three pair-pole motor as shown, the pulses applied to the coils must have a duration of $6.94/3 = 2.31$ ms. These pulses, as well as pulses needed to bring the rotor speed from rest up to 360 rpm are provided by controller 16, and are diagrammed in FIG. 4. The pulses applied to the coils of the 3 pole pairs applied in successive phases respectively designated $\phi A$, $\phi B$, $\phi C$. The $\phi A$ pulses are applied to the coils 57 mounted on poles A1 and A2, the $\phi B$ pulses are applied to the coils 57 mounted on poles B1 and B2 and the $\phi C$ pulses are applied to the coils 57 mounted on poles C1 and C2.

Briefly, in accordance with the present invention, pulses are applied to coils 57 only when the door 47 is properly latched (meaning that the disk is properly clamped) and a drive-on signal is received by controller 16. When both of these conditions first take place, the motor 15 is initialized or detented by applying a relatively long duration, e.g. 400 ms, pulse 60 to the pole pair A coils. As a result, the rotor rotates to a detent position illustrated in FIG. 3 in which two of its teeth 55 align themselves with teeth 54 on pole face A1 and two other teeth 55 align themselves with teeth 54 on pole face A2. After the 400 ms, $\phi A$ pulse 60, the controller 16 enters a ramp period during which pulses of decreasing durations, starting with a $\phi B$ pulse 62 of a selected duration are successively applied to the coils on pole pairs B, C, A, B, C, etc.

In the detent position of FIG. 3, the teeth 55 facing poles B1 and B2 are not aligned with the teeth 54 of these poles. Consequently, when the pole pair B coils (the coils on B1 and B2) are energized, they cause the rotor to incrementally rotate to move the rotor teeth 55 into aligment with the pole pair teeth 54. As the pulses are successively generated to incrementally rotate the rotor, their duration, during the ramp period is incrementally reduced to thereby increase rotor speed. This takes plaace until the pulse duration is 2.31 ms, which is needed to maintain the motor at the desired speed of 360 rpm as long as both the drive-on signal is present and the door 47 is latched. When either condition does not exist, the supply of pulses to all three coil phases is interrupted.

In FIG. 4, the successive pulses following $\phi B$ pulse 62 which are of decreasing durations, are designated by numerals 63–66 and 71–74, while the pulses of the constant duration needed to maintain the motor speed at 360 rmp are designated by numeral 80.

The reason for the ramp period and the decreasing duration pulses which are applied to the coils during this period is to enable the speed of the motor 15 to increase from 0 to 360 rmp in a relatively short time. As seen from FIG. 1, since in accordance with the present invention the drive shaft 20 of motor 15 is directly coupled to the hub 24 and through the clamped disk 32 to the collet 37 and the wedging means 38, the rotor 19 is subjected to a high inertia load. Although the short duration pulses 80 are of sufficient duration to maintain the rotor speed at 360 rmp once it reaches this speed, they are too short to develop the torque required to cause the rotor to start rotating from rest.

It should be pointed out that the duration of pulse 80 needed to maintain the motor at the desired speed, critically depend on the motor geometry, such as the number of teeth 55 of the rotor 19 and the number of pole pairs. However, the length of the ramp period and the duration of the first pulse 62 are not critical. Generally, the duration of each pulse 80 can be expressed in milliseconds as $D = 1000 \div (R \cdot S/60 \cdot P)$, where $R$ is the number of teeth on the rotor, $S$ is the desired speed in rpm and $P$ is the number of pole pairs. In the foregoing example, $D = 1000 \div 24 \cdot 360/60 \cdot 3 = 2.31$ ms. Durations of pulse 62 and those following it are chosen to be sufficiently long to enable the rotor, to which the high inertia load (represented mostly by the hub) is connected, to start turning from a rest condition, i.e. zero speed and increase in speed. The length of the ramp period is made sufficiently long to raise the motor speed from zero to the desired speed of 360 rpm. In a typical embodiment of the invention, the duration of pulse 62 is about 8.6 ms and the ramp period is about 2.5 seconds.

The various pulses shown in FIG. 4 may be generated by different circuit arrangements which can be incorporated in controller 16. Hereinafter, a relatively simple embodiment of controller 16 will be described in connection with FIGS. 4 and 5. As shown in FIG. 5, the controller 16 includes an input gate 82 with two input lines 83 and 84. Line 83 is assumed to be connected to a door 47 latch switch such that a low level signal is applied to line 83 only when the door 47 is latched, i.e. the disk 32 is clamped between hub 24 and collet 37. Line 84 is assumed to be connected to an appropriate source which applies a low level signal on line 84 to represent a drive-on command when the disk is to be driven. Only when both input lines 83 and 84 are low is the output of gate 82 on output line 86 low, representing a drive command.

Output line 86 is shown connected to a 400 ms one shot 88 and to a 2-input gate 90, whose other input is connected to the Q output of one shot 88. The output of gate 90 which is low as long as one of its inputs is high is connected to the reset terminal of a 3-state sequencer 92. The sequencer has 3 outputs designated S1, S2, and S3 which are respectively low when the sequencer is in states 1, 2 and 3. As long as the output of gate 90 is low, sequencer 92 is reset. When reset, it is in state 1 and therefore S1 is low.

The sequencer 92 is stepped or sequenced from state to state by the negative going zero crossing of each cycle of the output of a variable frequencey oscillator (VFO) 95, whose output is diagrammed in FIG. 4. The states of the sequencer are also shown in FIG. 4. The Q output of one shot 88 is connected to ramp control circuit 98 through an inverter 99. The output of circuit 98 serves as the input of VFO 95.

In addition, controller 16 is shown as including a gate 101 with one input connected S1 via inverter 102. Another input of gate 101 is connected to the Q output of one shot 88 through inverter 103. A third input is connected to line 86 through inverter 104. Gate 101 provides a high output to activate $\phi$A driver only when all three of its inputs are high. Also, the $\overline{Q}$ output of 88 is connected through an inverter 106 to a detent driver 110 which is activated only when the inverter 106 output is high. Both the $\phi$A driver and the detent driver 110 are connected to the $\phi$A coils on the poles A1 and A2. As will be shown later, driver 110 is activated only for 400 ms at the start of the drive command and $\phi$A driver is activated thereafter whenever the sequencer is in state 1 to apply the $\phi$A pulses to the $\phi$A coils on poles A1 and A2 which are assumed to be the $\phi$A poles.

The output S2 of sequencer 92 is connected through an inverter 112 to a $\phi$B driver which is connected to the $\phi$B coils on poles B1 and B2, i.e. the $\phi$B poles. The $\phi$B driver is activated only when the inverter 112 output is high, which occurs only when sequencer 92 is in state 2 and S2 is low. Likewise, output S3 of 92 is connected via an inverter 114 to a $\phi$C driver which is connected to the $\phi$C coils on poles C1 and C2 representing the $\phi$C poles. $\phi$C driver is activated only when the inverter 114 output is high which occurs only when the sequencer is in state 3 and S3 is low.

Attention is now directed to the ramp control circuit 98 which is comprised of a resistor R1 and a capacitor $C_A$ connected between +V and ground. The junction point therebetween is connected to the output of the inverrter 99 and the gate (G) terminal of field effect transistor 115. A resistor R2 is connected across the drain (D) and source (S) terminals of 115. The drain terminal is also connected to +V and the source terminal is connected to ground through serially connected variable resistor R3 and a fixed resistor R4. The junction point of R3 and R4, designated 120, is connected to the input of VFO 95.

In the quiescent state, one of the input lines 83 or 84 is high. Thus, line 86 is high. Also, the one shot is reset so that its Q and $\overline{Q}$ outputs are respectively high and low. Since the Q output is low the output of inverter 99 is high. Also, the capacitor $C_A$ is fully charged up. The potential at the gate terminal of 115 is high and therefore FET 115 is fully on, shorting out R2. As a result, only R3 and R4 are connected across +V and ground and the voltage at point 120 is relatively high. Under these conditions the output frequency of oscillator 95 is such that each cycle has a duration of 2.31 ms. However, even though oscillator 95 is free running, since in the quiescent state line 86 is high, the output of gate 90 is low and therefore the sequencer is held in the reset state and S1 is low. Thus, gate 101 does not provide a high output and therefore $\phi$A driver is not activated. Also, since one shot 88 is in a reset state $\overline{Q}$ is high and the inverter 106 output is low. Therefore, driver 110 is also not activated. Thus, since both $\phi$A driver and driver 100 are inactive, the $\phi$A coils are not energized. Also, since the sequencer is in state 1, neither the $\phi$B nor the $\phi$C coils are energized. Thus, none of the motor coils is energized and therefore the motor is at rest, i.e. at zero speed.

When the door 47 is latched and a drive-on signal is applied to line 84, line 86 goes low, triggering the one shot 88. During 400 ms, its Q output is high and its $\overline{Q}$ output is low. Since the Q output is high, the output of gate 90 remains low even though line 86 went low. Thus, sequencer 92 remains reset at state 1. However, since the $\overline{Q}$ ouput is low during the 400 ms, the inverter 106 output is high, thereby activating the detent driver 110 to activate the $\phi$A coils. The pulse applied to the $\phi$A coils is designated in FIG. 4 by numeral 60. It should be pointed out that since the Q output is high, the inverter 103 output is low and therefore gate 101 does not activate $\phi$A driver.

In addition as the Q output goes high, the inverter 99 output goes low, providing a fast discharge path for capacitor $C_A$. Its discharge is designated in FIG. 4 by numeral 121. The capacitor $C_A$ remains discharged for the entire 400 ms duration while Q output is high and the inverter 99 output is low.

When the capacitor $C_A$ is discharged, the FET 115 is fully cut off and R2 is therefore no longer shorted. Accordingly, the voltage at terminal 120 drops and the output frequency of oscillator 95 decreases. The resistors are chosen so that when FET 115 is fully cut off, the duration of each cycle of the oscillator output is equal to the desired duration of the widest pulse in the ramp period, represented FIG. 4 by pulse 62. As pointed out, this is 8.62 ms in a typical embodiment.

At the end of the 400 ms period, the Q and $\overline{Q}$ outputs of 88 go low and high respectively. When $\overline{Q}$ output goes high, detent driver 100 is deactivated, and as the Q output goes low, both inputs to gate 90 are low. Thus, the output of gate 90 is no longer low and therefore the sequencer 92 is free to be stepped. Thus, when the negative going zero crossing of the output of oscillator 95 occurs, the sequencer is stepped from state 1 to state 2. As diagrammed is FIG. 4, this is assumed to occur exactly at the end of the 400 ms period. It should be pointed out that if a negativve going zero crossing occurred just prior to the end of the 400 ms period, the $\phi$A driver will apply a pulse to the $\phi$A coils following the 400 ms period until the sequencer is stepped by the first negative going zero crossing following the 400 ms period, i.e. the resetting of one shot 88.

Once one shot 88 is reset, the Q output goes low and therefore the inverter 99 output goes high. Thus, a discharged path is no longer provided for capacitor $C_A$. Therefore, the capacitor begins to charge up via resistor R1 as shown in FIG. 4 by line 122. As the potential across the capacitor increases, the FET 115 is gradually switched from full off toward full on. Consequently, the resistance across the drain and source terminals decreases thereby decreasing the effective resistance of R2. This results in a ramp-shaped increase of the voltage at terminal 120 which causes oscillator 95 to provide and output of increasing frequency. When capacitor $C_A$ is fully charged, R2 is shorted out, and the period of the oscillator output is equal to the 2.31 ms duration of pulses 80, needed to maintain the motor at the desired speed.

As shown in FIG. 4, at each negative going zero crossing of the oscillator output, the sequencer is stepped to a succeeding state in the three-state sequence. During the ramp period the duration of each succeeding sequencer state decreases and therefore the durations of the pulses applied by the $\phi$A - $\phi$C drivers to the coils of the different phases decrease, as shown by pulses 62–66 and 71–74 in FIG. 4.

The motor 15 is maintained at the desired speed by applying pulses 80 thereto as long as both the door 47 is latched and the drive-on signal is received on line 84. If either input is interrupted, line 86 goes high thereby resetting sequencer 92 via gate 90. Additionally, line 86 going high disables gate 101 via inverter 104 to thereby stop rotor rotation since pulses will no longer be applied to any of the coils. When the line 86 goes low again, the entire start-up operation is repeated by the triggering of the one shot 88. In order to prevent any noise on line 86 from accidentally triggering the one shot 88, a resistor R5 and a capacitor $C_B$ are connected in series between line 86 and ground.

Summarizing, in accordance with the present invention, a flexible disk drive system is provided including a stepper motor whose drive shaft is directly coupled to the hub of a disk clamping unit. The stepper motor includes a stator and a rotor mounted for rotation with respect thereto. The rotor comprises a ferromagnetic cylinder having teeth around the circumference. The stator defines pole pairs having coils wound thereon. A motor controller is provided to simultaneously pulse the coils wound on poles of the same pair while sequentially pulsing the coils of different pole pairs to rotate the rotor. The motor controller includes means for responding to a command to bring the motor from rest up to a desired speed by supplying pulses of decreasing duation from a selected start up duration during a relatively short ramp period until the desired speed is reached.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privelege is claimed are defined as follows:

1. In a flexible disk drive system of the type including a rotatable hub and means for clamping a portion of a disk against said hub to rotate said disk as said hub is rotated, the improvement comprising:
   stepper motor means including a stator and a rotor mounted for rotation with respect thereto, said stator including pairs of opposed radially directed poles each having a coil wound thereon, said rotor comprising a cylinder of ferromagnetic material having a plurality of teeth fixed along the circumference thereof and a drive shaft fixed thereto coincident with the axis of said cylinder;
   means directly connecting said hub to said drive shaft for rotation therewith; and
   motor control means coupled to said stepper motor means for successively applying energizing pulses to the coil of successive pole pairs and including means for initially energizing coils of a selected pole pair for a selected detent period, and for subsequently successively applying energizing pulses to the coils wound on said pole pairs following said selected pole pair, said energizing pulses decreasing in duration from an initial to a final duration during a selected speed increase interval, whereby during said interval the motor speed increases from zero to a desired speed.

2. The system of claim 1 including command source means for supplying a first control signal when it is desired to drive said disk and control means for supplying a second control signal when said disk is properly clamped against said hub; and gate means responsive to said first and second control signals for actuataing said motor control means.

3. A system for driving a flexible magnetic disk of the type which has a central opening and is contained within a cartridge said comprising:
- a motor including a stator and a rotor mounted concentrically about a common axis;
- said rotor comprising a cylinder of ferromagnetic material having uniformly spaced teeth formed along the periphery thereof and a drive shaft fixed thereto extending along said common axis;
- bearing means supporting said rotor for rotational movement about said common axis;
- a hub mounted directly on the end of said drive shaft remote from said rotor;
- clamping means for selectively clamping the portion of a disk around the central opening thereof against said hub; and
- motor control means for supplying pulses to said motor of increasing frequency and decreasing duration to accelerate said rotor from rest to a desired speed.

4. The system of claim 3 wherein said stator includes a plurality of poles arranged in pairs, each pole pair being comprised of first and second aligned poles extending oppositely toward said common axis;
- a plurality of separate coils, each wound on one of said poles;
- said motor control means including means for energizing said pole pairs in sequence by successively applying pulses to the coils thereof.

5. The system of claim 4 including means responsive to said clamping means clamping a disk against said hub for supplying an enabling signal; and wherein
said motor control means includes means responsive to said enabling signal for generating a drive signal.

6. The system of claim 5 wherein said motor control means includes one shot means settable by the start of said drive command signal to a selected first state for a selected duration with said one shot means being switchable to a second state at the end of said selected duration;
- detent drive means coupled to said one shot means for initially applying energizing pulses to coils wound about a selected pole pair when said one shot is in said first state; and
- circuit means for subsequently successively applying energizing pulses to the coils wound about different pole pairs, said pulses decreasing in duration from a first predetermined duration to a second predetermined duration during a selected time period.

7. The system of claim 4 wherein each of said poles defines a pair of teeth spaced a distance equal to the distance between adjacent teeth along said rotor periphery; and wherein
poles of different pole pairs are spaced along said rotor periphery such that the teeth of only one pole pair at a time are aligned with teeth on said rotor.

* * * * *